United States Patent
Barger et al.

(10) Patent No.: US 10,776,332 B2
(45) Date of Patent: Sep. 15, 2020

(54) MANAGING COOPERATIVE COMPUTER SOFTWARE APPLICATIONS

(71) Applicant: International Business Machines Corporation, Armink, NY (US)

(72) Inventors: Artem Barger, Haifa (IL); Gennady Laventman, Haifa (IL); Alexey Roytman, Gival Ela (IL); Bruno Wassermann, Haifa (IL)

(73) Assignee: International Business Machines Corporation, Armonk, NY (US)

(*) Notice: Subject to any disclaimer, the term of this patent is extended or adjusted under 35 U.S.C. 154(b) by 585 days.

(21) Appl. No.: 15/427,070

(22) Filed: Feb. 8, 2017

(65) Prior Publication Data

US 2018/0225111 A1    Aug. 9, 2018

(51) Int. Cl.
*G06F 16/22* (2019.01)
*G06F 11/36* (2006.01)

(52) U.S. Cl.
CPC .......... *G06F 16/22* (2019.01); *G06F 11/3604* (2013.01)

(58) Field of Classification Search
CPC . G06F 7/02; G06F 9/5011; G06F 9/44; G06F 11/3604; G06F 16/22
See application file for complete search history.

(56) References Cited

U.S. PATENT DOCUMENTS

| | | | |
|---|---|---|---|
| 8,224,770 B2* | 7/2012 | Lunev | G06F 9/4843 707/609 |
| 8,533,796 B1* | 9/2013 | Shenoy | H04L 63/0815 380/229 |
| 8,627,270 B2* | 1/2014 | Fox | G06F 8/71 717/100 |
| 9,262,127 B2 | 2/2016 | patrick | |
| 9,300,577 B2* | 3/2016 | Uluderya | H04L 45/70 |
| 9,565,091 B2* | 2/2017 | Dupre | H04L 41/0213 |
| 9,619,662 B1* | 4/2017 | Beda, III | H04L 63/00 |
| 9,710,752 B2* | 7/2017 | Salajegheh | G06N 5/04 |
| 2003/0069957 A1* | 4/2003 | Malmskog | H04L 41/5083 709/223 |
| 2003/0105800 A1* | 6/2003 | Cullen | H04L 29/06 709/201 |

(Continued)

FOREIGN PATENT DOCUMENTS

WO    2016020731    2/2016

OTHER PUBLICATIONS

Giovanni Toffetti et al., "An architecture for self-managing microservices", AIMC '15 Proceedings of the 1st International Workshop on Automated Incident Management in Cloud, pp. 19-24, 2015.

(Continued)

*Primary Examiner* — Miranda Le
(74) *Attorney, Agent, or Firm* — Dan Swirsky

(57) ABSTRACT

Managing cooperative computer software applications by applying a link analysis algorithm to a data set including identifiers representing a plurality of computer software applications and including indicators of operational relationships between the computer software applications, thereby associating a cooperation value with each of the computer software applications represented within the data set, and notifying a computer software application manager of the computer software applications and their associated cooperation values.

6 Claims, 3 Drawing Sheets

(56) References Cited

U.S. PATENT DOCUMENTS

| | | | |
|---|---|---|---|
| 2008/0043617 A1* | 2/2008 | Schekochikhin | ... H04L 43/0817 370/229 |
| 2010/0299437 A1 | 11/2010 | Moore | |
| 2011/0066719 A1* | 3/2011 | Miryanov | ........... G06F 11/3495 709/224 |
| 2013/0124433 A1* | 5/2013 | Waldron | ................ G06Q 40/00 705/36 R |
| 2013/0159529 A1* | 6/2013 | Mitchell | ................ G06F 16/11 709/226 |
| 2014/0040231 A1* | 2/2014 | Lin | ....................... G06F 16/951 707/708 |
| 2014/0075502 A1* | 3/2014 | Aissi | ....................... G06F 21/60 726/1 |
| 2014/0153392 A1* | 6/2014 | Gell | .................. H04W 28/0236 370/230 |
| 2014/0280234 A1* | 9/2014 | Chang | ................ G06F 16/9535 707/749 |
| 2016/0110817 A1 | 4/2016 | Buccetti et al. | |
| 2016/0124742 A1 | 5/2016 | Rangasamy et al. | |
| 2016/0224328 A1* | 8/2016 | Risbood | .............. H04L 41/5012 |
| 2016/0307244 A1* | 10/2016 | Muller | ...................... G06F 8/60 |

OTHER PUBLICATIONS

Vinod Keshaorao Pachghare., "Microservices Architecture for Cloud Computing", Journal of Information Technology and Sciences, vol. 2 Issue 1, 2016.

* cited by examiner

MANAGING COOPERATIVE COMPUTER SOFTWARE APPLICATIONS

BACKGROUND

In a microservice architecture, a large, complex computer software application is implemented as multiple, smaller, independently-executed computer software applications called "microservices" that cooperatively perform different functions in service of the overarching application, typically interacting with each other over a computer network. While it is often desirable, in order to achieve reliability and performance goals, to deploy multiple instances of various microservices, as well as to deploy microservices on the most powerful computing platforms available, where the availability of computing resources is limited, the efficient and judicious allocation of such computing resources to the various microservices that form a cooperative computing system is often necessary.

SUMMARY

In one aspect of the invention a method is provided for managing cooperative computer software applications, the method including applying a link analysis algorithm to a data set including identifiers representing a plurality of computer software applications and including indicators of operational relationships between the computer software applications, thereby associating a cooperation value with each of the computer software applications represented within the data set, and notifying a computer software application manager of the computer software applications and their associated cooperation values.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
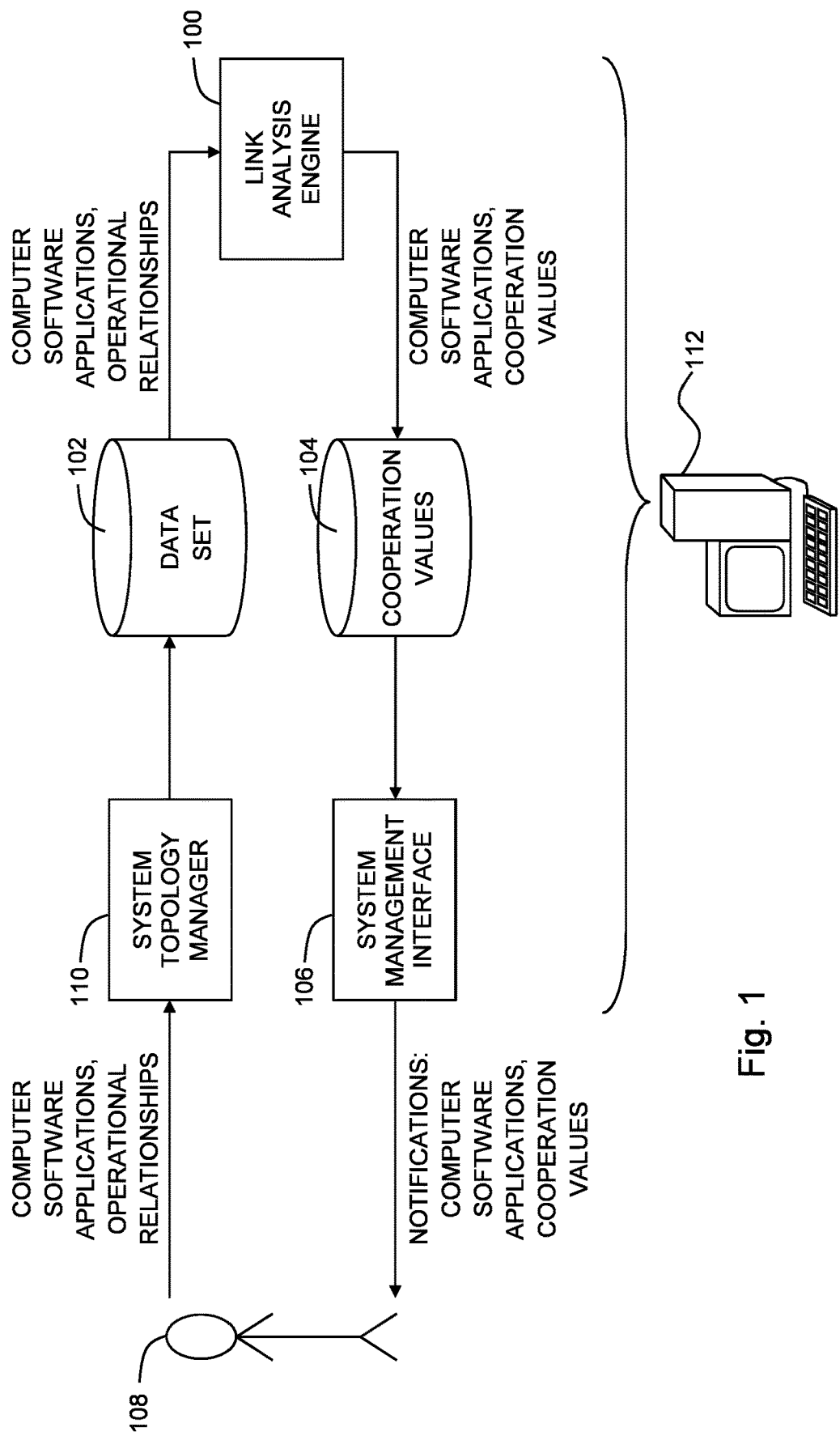
FIG. 1 is a simplified conceptual illustration of a system for managing cooperative computer software applications, constructed and operative in accordance with an embodiment of the invention.

Reference is now made to FIG. 1, which is a simplified conceptual illustration of a system for managing cooperative computer software applications, constructed and operative in accordance with an embodiment of the invention. In the system of FIG. 1, a link analysis engine 100 is configured to apply a link analysis algorithm to a data set 102 that includes identifiers representing multiple computer software applications that cooperate with one another, such as of microservices in a microservice architecture, and also includes indicators of operational relationships between the computer software applications. Link analysis engine 100 is configured to apply any known link analysis algorithm, such as the PAGERANK or HITS link analysis algorithms, to data set 102. In one embodiment the indicators in data set 102 of operational relationships between the computer software applications indicate the direction of each operational relationship. Thus, for example, where computer software application A receives data and/or instructions from computer software application B, data set 102 includes an indicator of an operational relationship whose direction is from computer software application B to computer software application A. And where computer software application A and computer software application B receive data and/or instructions from each other, data set 102 includes a single indicator indicating a bi-directional operational relationship between computer software application A and computer software application B or, alternatively, two separate indicators of two uni-directional operational relationships between computer software application A and computer software application B.

In applying the link analysis algorithm to data set 102, link analysis engine 100 associates a cooperation value with each of the computer software applications represented within data set 102, where the cooperation value associated with a computer software application indicates the magnitude of the cooperation of the computer software application with the other computer software applications represented within data set 102. The cooperation values associated with each of the computer software applications represented within data set 102 indicate the relative importance, in accordance with importance criteria, of each of the computer software applications represented within the data set. In one embodiment, the cooperation value associated with a computer software application is based on the number and direction of the operational relationships in which the computer software application is involved relative to the number and direction of the operational relationships in which the other computer software applications represented within data set 102 are involved. In this embodiment, the importance criteria are the operational relationships themselves, where each operational relationship is of equal importance and is, in effect, given equal weight. In another embodiment, importance criteria are used that relate to a characteristic associated with the operational relationships, where different weights are associated with the importance criteria to represent the magnitude of a quality or a quantity of the characteristic. For example, where computer software application A requests data and/or instructions from computer software application B, the indicator in data set 102 of this operational relationship includes a weight representing the expected number of such requests during a given period of time. In another example, a weight associated with an operational relationship between two computer software applications indicates a probability that a communications link between the computer software applications will fail.

A cooperation values set 104 is shown to represent the result of link analysis engine 100 applying the link analysis algorithm to data set 102, where cooperation values set 104 includes the cooperation values associated with the computer software applications represented within data set 102.

A system management interface 106 is configured to provide notifications regarding the computer software applications and their associated cooperation values, such as by providing such information to a computer software application manager 108 who is responsible for managing the computer software applications. In one embodiment, system management interface 106 provides such notifications by presenting the computer software applications and their associated cooperation values, such as in a report that is printed or displayed on a computer display, in descending order of their associated cooperation values. In one embodiment system management interface 106 is configured to allocate computing resources to the computer software applications in accordance with their associated cooperation values, either automatically in accordance with a predefined computing resource allocation plan, or manually, such as where a computer software application manager who is responsible for managing the computer software applications makes such allocations using system management interface 106. Such allocation of computing resources to the computer software applications include, for example, executing a number of instances of a computer software application in proportion to its associated cooperation value, as well as allocating different computer hardware and network bandwidth to different computer software applications in proportion to their associated cooperation values.

A system topology manager 110 is configured to populate data set 102 with the identifiers representing the computer software applications and with the indicators of operational relationships between the computer software applications, either automatically in accordance with conventional techniques, or manually, such as where computer software application manager 108 who is responsible for managing the computer software applications populates data set 102 with this information.

Any of the elements shown in FIG. 1 are preferably implemented by one or more computers in computer hardware and/or in computer software embodied in a non-transitory, computer-readable medium in accordance with conventional techniques, such as where any of the elements shown in FIG. 1 are hosted by a computer 112.

Figure 2:
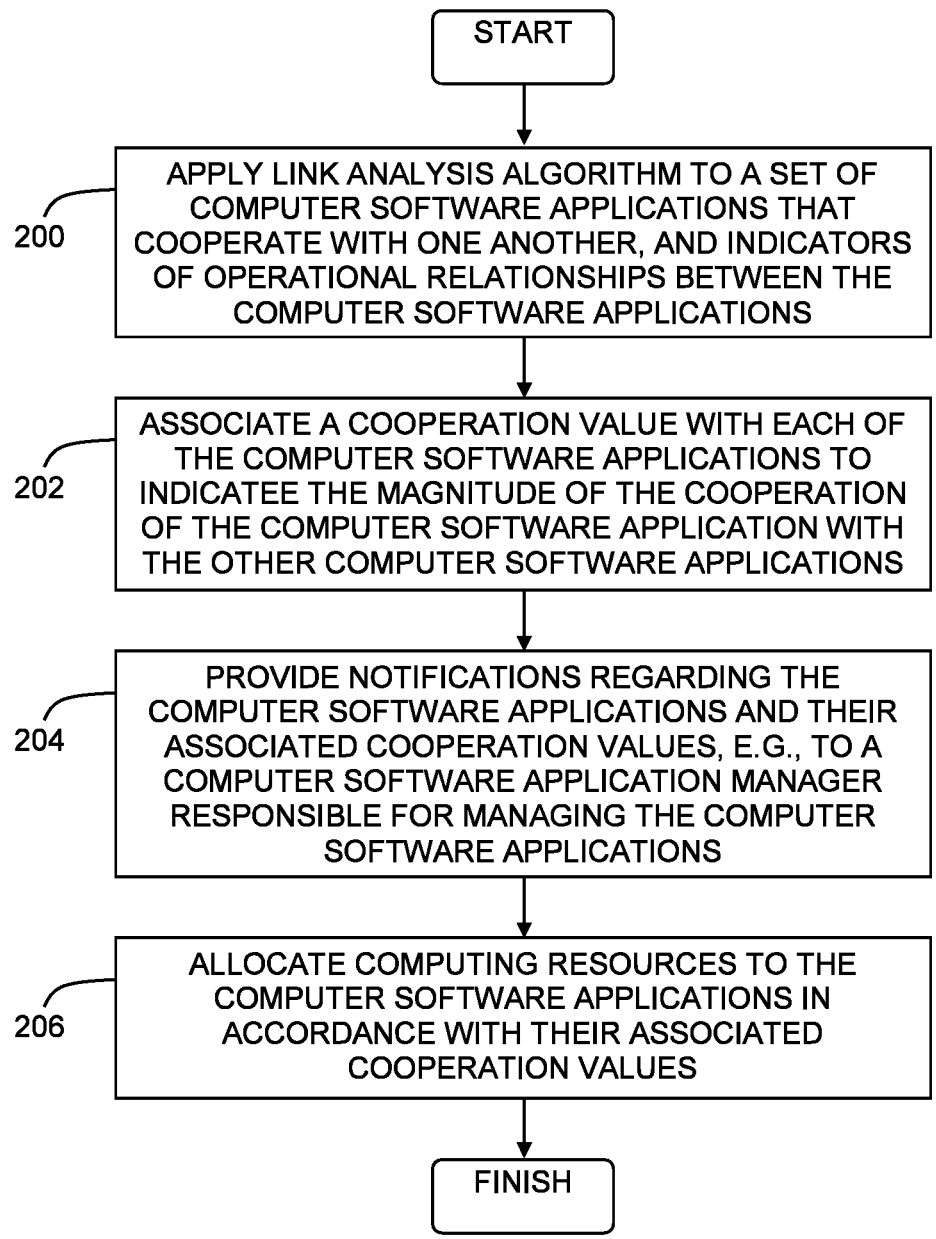
FIG. 2 is a simplified flowchart illustration of an exemplary method of operation of the system of FIG. 1, operative in accordance with various embodiments of the invention.

Reference is now made to FIG. 2, which is a simplified flowchart illustration of an exemplary method of operation of the system of FIG. 1, operative in accordance with an embodiment of the invention. In the method of FIG. 2, a link analysis algorithm such as the PAGERANK or HITS link analysis algorithms, is applied to a data set that includes identifiers representing multiple computer software applications that cooperate with one another, such as of microservices in a microservice architecture, and also includes indicators of operational relationships between the computer software applications (step 200). In applying the link analysis algorithm to the data set, a cooperation value is associated with each of the computer software applications represented within the data set, where the cooperation value associated with a computer software application indicates the magnitude of the cooperation of the computer software application with the other computer software applications represented within the data set (step 202). Notifications are provided regarding the computer software applications and their associated cooperation values, such as to a computer software application manager who is responsible for managing the computer software applications (step 204). Computing resources are allocated to the computer software applications in accordance with their associated cooperation values, either automatically in accordance with a predefined computing resource allocation plan, or manually, such as by the computer software application manager (step 206).

Figure 3:
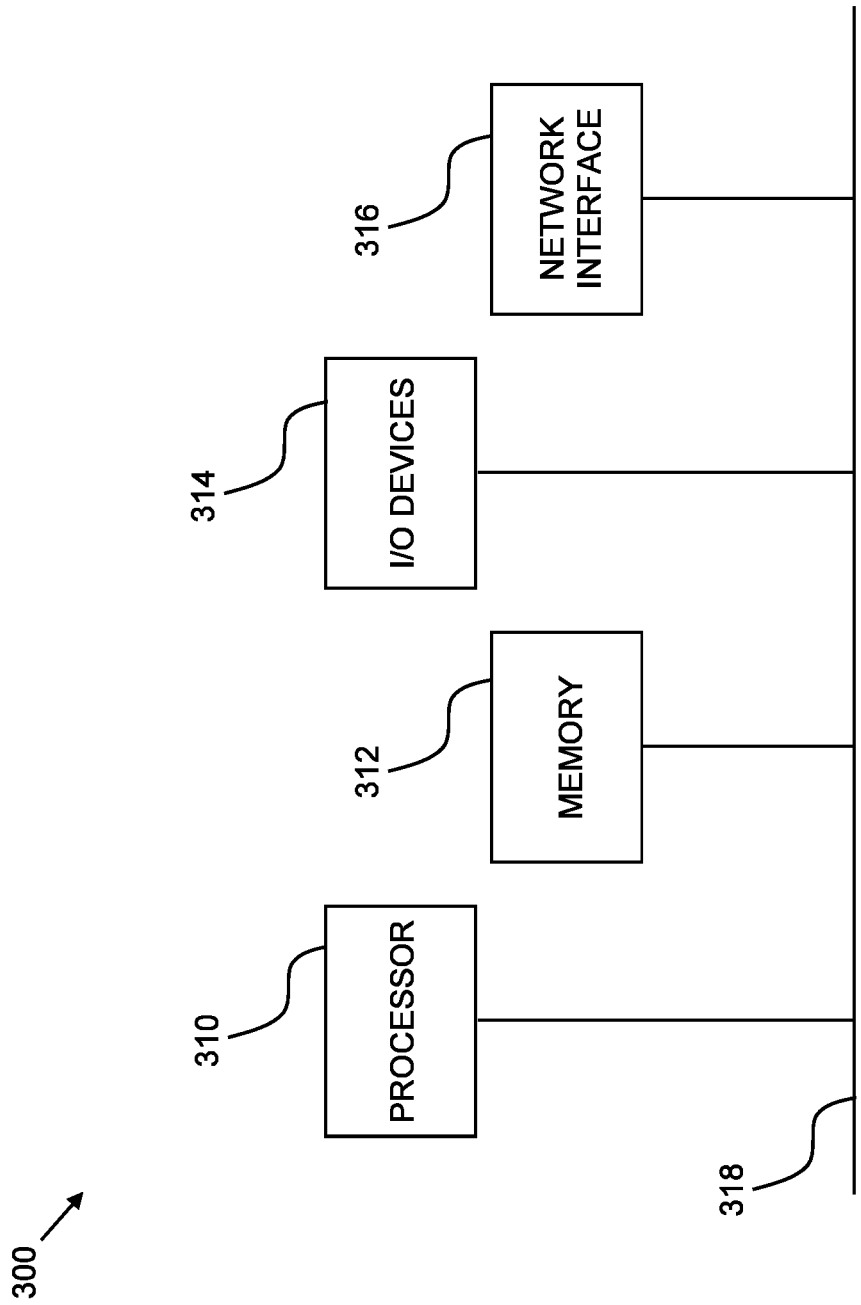
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing cooperative computer software applications, the method comprising:

populating a data set with identifiers representing a plurality of computer software applications, indicators of operational relationships between the computer software applications, and weights associated with the operational relationships;

applying a link analysis algorithm to the data set, thereby determining a plurality of cooperation values,
   wherein each of the cooperation values is associated with a different one of the computer software applications represented within the data set, and wherein each of the cooperation values indicates a magnitude of cooperation of its associated computer software application with the other computer software applications represented within data set, and
   wherein the cooperation value associated with each of the computer software applications indicates relative importance, in accordance with predefined importance criteria associated with the weights, of each of the computer software applications represented within the data set; and allocating computing resources to any of the computer software applications in proportion to its associated cooperation value, the allocating performed responsive to
   notifying a computer software application manager of the computer software applications and their associated cooperation values, and
   implementing a predefined computing resource allocation plan for automatic allocation of computer resources,
wherein the allocating of computing resources to any of the computer software applications in proportion to its associated cooperation value includes
   executing a number of instances of any of the computer software applications in proportion to its associated cooperation value, and allocating any of different computer hardware and network bandwidth to different ones of the computer software applications in proportion to their associated cooperation values.

2. The method according to claim 1 wherein the notifying comprises presenting the computer software applications in descending order of their associated cooperation values.

3. A system for managing cooperative computer software applications, the system comprising:
    a computer hardware;
    a computer software embodied in a non-transitory computer-readable medium;
        a system topology manager configured to populate a data set with identifiers representing a plurality of computer software applications, indicators of operational relationships between the computer software applications, and weights associated with the operational relationships;
        a link analysis engine applies a link analysis algorithm to the data set, thereby determining a plurality of cooperation values,
            wherein each of the cooperation values is associated with a different one of the computer software applications represented within the data set, and wherein each of the cooperation values indicates a magnitude of cooperation of its associated computer software application with the other computer software applications represented within data set, and
            wherein the cooperation value associated with each of the computer software applications indicates relative importance, in accordance with pre-defined importance criteria associated with the weights, of each of the computer software applications represented within the data set; and
        a system management interface allocates computing resources to any of the computer software applications in proportion to its associated cooperation value, the allocating performed responsive to
            notifying a computer software application manager of the computer software applications and their associated cooperation values, and
            implementing a predefined computing resource allocation plan for automatic allocation of computer resources,
    wherein the system management interface allocates computing resources to any of the computer software applications in proportion to its associated cooperation value by performing
        executing a number of instances of any of the computer software applications in proportion to its associated cooperation value, and
        allocating any of different computer hardware and network bandwidth to different ones of the computer software applications in proportion to their associated cooperation values.

4. The system according to claim 3 wherein the system management interface is configured to present the computer software applications in descending order of their associated cooperation values.

5. A computer program product for managing cooperative computer software applications, the computer program product comprising:
    a non-transitory, computer-readable storage medium; and
    computer-readable program code embodied in the storage medium to:
        populate a data set with identifiers representing a plurality of computer software applications, indicators of operational relationships between the computer software applications, and weights associated with the operational relationships,
        apply a link analysis algorithm to the data set, thereby determining a plurality of cooperation values,
            wherein each of the cooperation values is associated with a different one of the computer software applications represented within the data set, and wherein each of the cooperation values indicates a magnitude of cooperation of its associated computer software application with the other computer software applications represented within data set, and
            wherein the cooperation value associated with each of the computer software applications indicates relative importance, in accordance with pre-defined importance criteria associated with the weights, of each of the computer software applications represented within the data set, and
        allocate computing resources to any of the computer software applications in proportion to its associated cooperation value, the allocating performed responsive to
            notifying a computer software application manager of the computer software applications and their associated cooperation values, and
            implementing a predefined computing resource allocation plan for automatic allocation of computer resources,
    wherein the computer-readable program code allocates computing resources to any of the computer software applications in proportion to its associated cooperation value by performing
        executing a number of instances of any of the computer software applications in proportion to its associated cooperation value, and
        allocating any of different computer hardware and network bandwidth to different ones of the computer software applications in proportion to their associated cooperation values.

6. The computer program product according to claim 5 wherein the computer-readable program code presents the computer software applications in descending order of their associated cooperation values.

\* \* \* \* \*